Nov. 29, 1955          R. G. PADRON          2,725,512
SELECTIVE ELECTRIC MOTOR HAVING MULTIPLE CONTACTS
Filed July 7, 1954
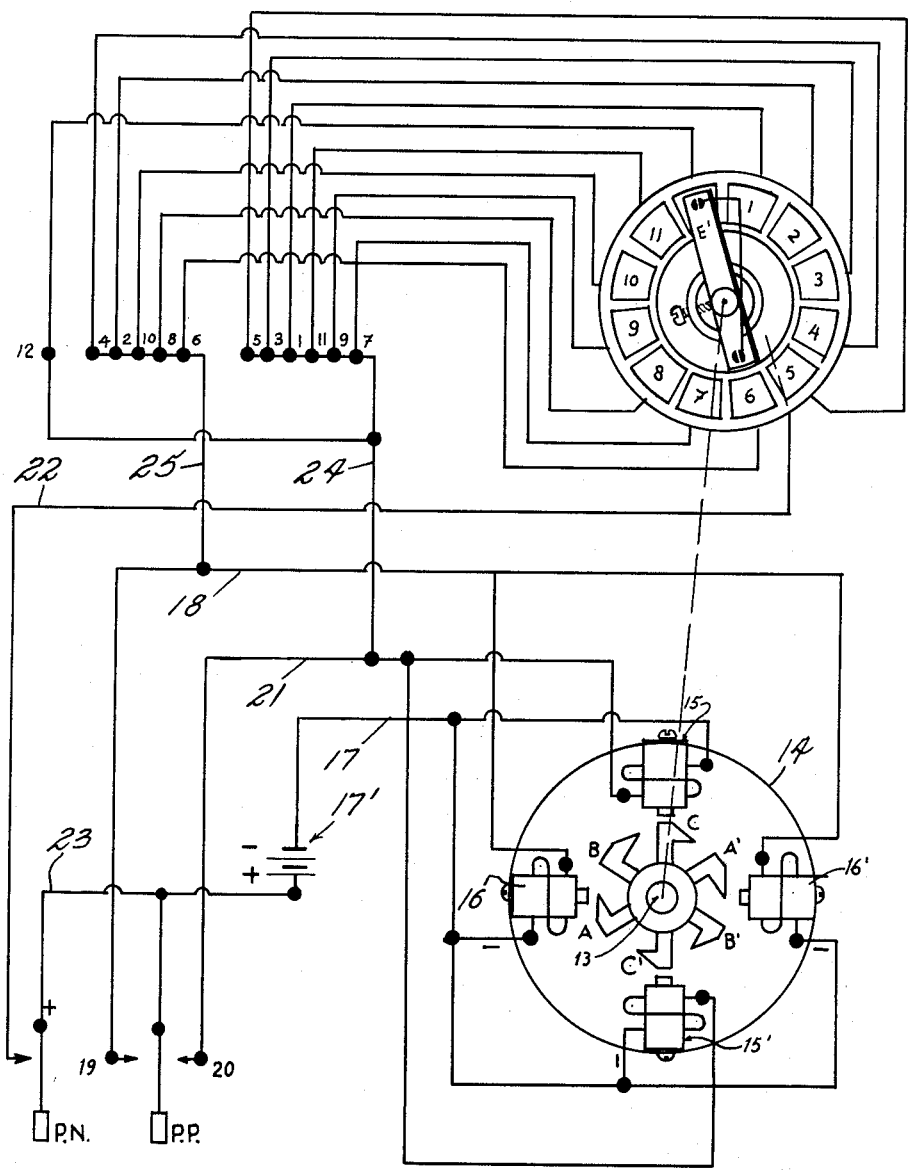
Inventor
Roque Giner Padron
By
Peck & Peck
Attorneys United States Patent Office 2,725,512
Patented Nov. 29, 1955

2,725,512

SELECTIVE ELECTRIC MOTOR HAVING MULTIPLE CONTACTS

Roque Giner Padron, Havana, Cuba

Application July 7, 1954, Serial No. 441,767

Claims priority, application Cuba July 7, 1953

1 Claim. (Cl. 318—254)

This invention relates broadly to the art of electric motors and in its more specific aspects it relates to electric motors and the control means therefor whereby said motor may be operated step by step; and the nature and objects of the invention will be readily recognized and understood by those skilled in the arts to which it relates in the light of the following explanation and detailed description of the accompanying drawings illustrating what I at present believe to be the preferred embodiments or mechanical expressions of my invention from among various other forms, arrangements, combinations and constructions, of which the invention is capable within the spirit and scope thereof.

I have devised an electric selective motor having multiple contacts, and this motor is highly advantageous for many reasons which will become apparent as this description proceeds, one of said reasons being that the motor is adaptable for and highly useful in a great many applications. The motor is adapted to operate step by step by means of electric current impulses, and I have also devised this motor and control means therefor so that it will operate in a continuous manner upon the application thereto of electric current, the control means also provides electrical mechanism whereby the current may be interrupted by means of a group of contacts in a brush all as will be hereinafter explained.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

The drawing is a diagrammatic view of the complete electric circuit of the motor and illustrates the series of electrical contacts for use with a single brush.

In the accompanying drawing I have illustrated the electric motor of this invention and have used the numeral 14 to designate in its entirety the frame or cover of the motor, this supporting frame or cover may be mounted in any suitable and conventional manner. I have used the numeral 13' to designate the rotor of the motor in its entirety and this rotor 13' is rotatively mounted on an axle 13 which is mounted in any suitable manner so that the rotor may rotate within the annular cover or supporting frame 14. This rotor comprises a series of cores of magnetic attraction which are indicated by the letters A, B, C, A', B', C' which extend radially from the axle 13. In the drawings I have illustrated six of such cores, however, it is to be understood that this rotor may be provided with ten or more of such cores and the rotor will still fall within the spirit and scope of this invention. In the particular example illustrated, I mount diametrically opposed pairs of coils or electromagnets 15—15' and 16—16', the electromagnets of each pair being diametrically opposed and all of the magnets or coils being fixed in any suitable manner to the inner circumferential wall of the cover or frame 14 to extend inwardly therefrom to an innermost position closely adjacent to the outer end of the cores A, B, C, A', B', C'. It will be apparent that when the rotor is operating the cores thereof will pass near the four coils or electromagnets.

Consideration of the drawing shows that all of the negatives of the four coils or electromagnets 15—15' and 16—16' are connected to a conductor 17 which is in contact with the negative pole in a battery 17'. The positive sides of the coils or electromagnets 16 and 16' are connected to a conductor 18 which leads to one contact 19 of a double contact or switch PP. The positive sides of the other two coils 15 and 15' are connected to a conductor 21 which goes to the other contact 20 of the aforesaid PP switch.

Consideration of the drawing indicates that a brush carrier E' is operatively mounted on the rotor axle 13 for rotation therewith, and this brush carrier E' passes over the contacts 1 to 12 which are conveniently positioned in a circumferential manner within the interior of the annular cover or support member 14 of the motor, the contacts 1 to 12 being suitably mounted and properly insulated in a manner well known in this art. Within the circumferentially mounted group of contacts is positioned what I shall term a central contact which is connected to a simple switch PN by means of a conductor 22, the switches PN and PP being connected into the electric circuit and receiving current from the battery or other source of current by means of a conductor 23.

Contacts 1, 3, 5, 7, 9, 11 and 12 of the circumferential band of conductors are connected to the conductor 21 by means of a conductor 24, the conductor 21 being connected to the other contact 20 of the switch PP. The contacts 2, 4, 6, 8 and 10 of the circumferential band of contacts are connected to the conductor 18 by means of a conductor 25, the conductor 18 being electrically connected to the other contact 19 of the switch PP.

The various operations of this motor will now be described.

*Continued operation over steps 1 to 11 with stop in step 12.*—In this situation assuming that the brush E' is on contact 2 and the switch PN is operated, the current will flow through conductor 22 to the central contact, thence through the brushes of the brush carrier E' to contact 2, through conductor 25 and conductor 18 to the coils or electromagnets 16—16' and will flow out of the negative sides of the aforesaid electromagnets by means of conductor 17 to ground or the negative pole of the battery 17' to thereby close the circuit. These coils or electromagnets 16—16' will attract cores A—A' and cause a relatively small degree of rotation thereof which will result in a corresponding rotary movement of the axle 13 which will also move the brush carrier E' which will cause contact of the outside brush against contact 3. In this new position of the brush the electric current flowing out of the battery will pass through the switch PN and from contact 3 will flow through conductor 24 to the conductor 21 and to the coils or electromagnets 15—15'. The current will flow from the negative sides of the electromagnets 15—15' through the conductor 17 to ground or the negative pole of the battery 17'. This will attract the cores B—B' of the rotor revolving said cores, axle and brush carrier so that it will abut and come into contact with the contact 4. In this new position the current will flow through the contact 4, the conductor 25 and the conductor 18 and again to the coils 16—16' to the negative pole whereupon cores C—C' will be attracted by these energized coils and will produce further rotary action of the axle 13 and its brush carrier E' so that the brush will now make contact with contact 5. This alternated and continued change of the flow of current through the circuit including the diametrically opposed pairs of coils or electromagnets produces constant rotary movement of the brush carrier E' to bring its outside brush into contact with all of the contacts in the circumferential band which includes the contacts 1 to 11, but when it reaches contact 12 it becomes stationary because when this contact is electrically connected to conductor 21 and to the coils or electromagnets 15—15', such as the odd numbered contacts, the attraction ceases in the coils or electromagnets 16—16' and the rotation of the axle 13 ceases so that the whole rotor is at rest.

The operation just described takes place in order to put the group of brushes in the point from which the selection of the desired step must be started. After putting the rotor and brushes in step 12 the switch PN is operated.

*Step by step operation to select a determined contact.*—With the switches PN and PP in nonoperative position it is necessary to operate switch PP closing the circuit in contact 19, and if we assume that the brush carrier E' is in the position in which its outside brush is in contact with contact 12, then the current from the battery 17' will flow by conductor 19 to conductor 18 and to the coils or electromagnets 16—16' and from such electromagnets by conductor 17 to ground or negative pole of the battery. The cores A—A' which are situated nearer are attracted by said coils or electromagnets 16—16'. When said cores A—A' are thereby attracted the axle and cores will be caused to rotate passing the brush from contact 12 to contact 1 where it will stop. When this occurs, switch PP is again operated in order to close the circuit through contact 20 so that current will flow through conductor 21 to the coils or electromagnets 15—15' whereupon cores B—B' will be attracted which will move the brush from contact 1 to 2 where it will stop. Switch PP is thereupon again operated to close the circuit through contact 19 so that the current will again flow through conductor 22 and coils or electromagnets 16—16'. In this situation the cores C—C' will be attracted to thereby move the brush from contact 2 to contact 3 where it will stop. In this way the contact desired can be selected in accordance with the number of pulsations sent alternately to the two electromagnetic fields of the motor.

*Continuous rotation as a motor.*—If a continuous rotation of the motor is desired in the work applied to, contact 12 will be connected to the electromagnets with which are connected the other even numbered contacts and then the switch PN is operated and a continuous rotation of the rotor will occur.

The stop made in contact 12 as explained in the first example hereinabove may be made in any other desired one, which is sufficient to connect the desired contact to the coils to which are connected odd numbered contacts if an even numbered contact has been chosen, or other coils to which are connected even numbers if an odd numbered contact has been selected.

I claim:

An electric motor including an annular stationary frame, pairs of electromagnets fixed to said frame and extending inwardly therefrom and the electromagnets of each pair being oppositely disposed and each pair of electromagnets when energized creating an electromagnetic field within the frame, a rotor including an axle and a series of cores fixed to and radially extending from the axle, and the cores being formed of magnetically attractive material, and the axle being mounted within said frame so that upon rotation of the axle the cores will pass through said magnetic fields, and control means for said electric motor including a brush carrier fixed to said axle for rotation therewith, a circumferential band of two groups of electric contacts carried on said annular frame and a central contact, a brush on said brush carrier in continuous contact with said central contact, a further brush on said brush carrier adapted for successive contact with said circumferential band of contacts when the rotor is revolving, a source of electrical energy, a conductor connecting the positive pole of said source of electrical energy with said central contact and a switch in said conductor, a further conductor connecting one of said groups of electric contacts with one contact of a double alternating switch which is connected with one pair of electromagnets, the other contact of said double alternating switch being connected to said other group of electric contacts and to the other pair of electromagnets, said double alternating switch being connected to the positive pole of said source of electrical energy, the other sides of said electromagnets being connected to the negative pole of said source of electrical energy, and the major number of contact of one group of electrical contacts which are connected to a pair of electromagnets being alternately positioned relative to the contacts of the other group of electrical contacts which are connected to the other pair of electromagnets, and the remaining number of said contacts being consecutively positioned.

References Cited in the file of this patent

UNITED STATES PATENTS

| | | |
|---|---|---|
| 1,353,025 | Chicken et al. | Sept. 14, 1920 |
| 1,367,679 | Adsit et al. | Feb. 8, 1920 |
| 2,477,993 | Lewis | Aug. 2, 1949 |
| 2,527,027 | Millen | Oct. 29, 1950 |